United States Patent
Schindler et al.

(10) Patent No.: US 10,903,629 B2
(45) Date of Patent: Jan. 26, 2021

(54) SWITCH CABINET HAVING A FRAME AND AN INTERIOR FITTING COMPONENT, CORRESPONDING SWITCH CABINET ASSEMBLY, AND CORRESPONDING INTERIOR FITTING COMPONENT

(71) Applicant: RITTAL GMBH & CO. KG, Herborn (DE)

(72) Inventors: Timo Schindler, Gladenbach (DE); Daniel Brück, Sinn (DE); Heiko Holighaus, Eschenburg (DE)

(73) Assignee: RITTAL GMBH & CO. KG

( * ) Notice: Subject to any disclaimer, the term of this patent is extended or adjusted under 35 U.S.C. 154(b) by 0 days.

(21) Appl. No.: 16/328,304

(22) PCT Filed: Jun. 30, 2017

(86) PCT No.: PCT/DE2017/100549
§ 371 (c)(1),
(2) Date: Feb. 26, 2019

(87) PCT Pub. No.: WO2018/050146
PCT Pub. Date: Mar. 22, 2018

(65) Prior Publication Data
US 2019/0214798 A1    Jul. 11, 2019

(30) Foreign Application Priority Data
Sep. 15, 2016   (DE) .................. 10 2016 117 393

(51) Int. Cl.
*A47B 81/00*        (2006.01)
*H02B 1/01*         (2006.01)
*H02B 1/30*         (2006.01)

(52) U.S. Cl.
CPC ............. *H02B 1/013* (2013.01); *H02B 1/301* (2013.01)

(58) Field of Classification Search
CPC . H02B 1/043; H02B 1/32; H02B 1/34; H02B 1/301
See application file for complete search history.

(56) References Cited

U.S. PATENT DOCUMENTS

| 4,643,319 | A | * | 2/1987 | Debus | ............... H02B 1/01 |
|---|---|---|---|---|---|
| | | | | | 211/182 |
| 6,155,434 | A | * | 12/2000 | Benner | .............. H02B 1/301 |
| | | | | | 211/190 |

(Continued)

FOREIGN PATENT DOCUMENTS

| DE | 3917985 A1 | 12/1989 |
|---|---|---|
| DE | 19647802 C1 | 1/1998 |

(Continued)

OTHER PUBLICATIONS

International Search Report (in English and German) and Written Opinion (in German) issued in PCT/DE2017/100549, dated Sep. 21, 2017; ISA/EP.

(Continued)

*Primary Examiner* — Matthew W Ing
(74) *Attorney, Agent, or Firm* — Harness, Dickey & Pierce, P.L.C.

(57) ABSTRACT

A switch cabinet (1) comprising a square rack (2) consisting of four vertical profiles (3) and eight horizontal profiles (4), wherein four of the profiles (3, 4) form the rectangular profile frame and two of the four profiles (3, 4) forming the profile frame and extending in parallel to one another each include a first fastening profile side (5) having a first row of fastening mounts (6) spaced apart from one another while maintaining a constant grid dimension (M), wherein the first fastening profile sides (5) are situated in a common plane (E) and mounted on these two first fastening profile sides (5) is a first interior structural component (7) extending between the parallel profiles, which includes a mounting side (8)

(Continued)

having a second row of fastening mounts (9), which extend perpendicularly to the first row (6), characterized in that the second row of fastening mounts (9) is arranged in the direction of extension (y) of the first row of fastening mounts (6) while maintaining the grid dimension (M) of the first row of fastening mounts (6).

9 Claims, 8 Drawing Sheets

(56) References Cited

U.S. PATENT DOCUMENTS

| | | | | |
|---|---|---|---|---|
| 6,170,673 | B1 * | 1/2001 | Nicolai | H02B 1/32 |
| | | | | 211/26 |
| 6,238,028 | B1 * | 5/2001 | Benner | H02B 1/32 |
| | | | | 211/192 |
| 6,533,373 | B2 | 3/2003 | Reuter et al. | |
| 9,871,353 | B2 | 1/2018 | Boehme et al. | |
| 10,024,348 | B2 | 7/2018 | Schindler | |
| 2001/0022490 | A1 | 9/2001 | Reuter et al. | |
| 2006/0044766 | A1 * | 3/2006 | Hartel | H02B 1/306 |
| | | | | 361/724 |
| 2013/0069501 | A1 * | 3/2013 | Liu | A47F 5/01 |
| | | | | 312/223.1 |
| 2016/0352080 | A1 | 12/2016 | Brueck et al. | |
| 2016/0352082 | A1 | 12/2016 | Boehme et al. | |
| 2016/0363150 | A1 | 12/2016 | Schindler | |
| 2018/0375302 | A1 | 12/2018 | Reuter et al. | |

FOREIGN PATENT DOCUMENTS

| | | | | |
|---|---|---|---|---|
| DE | 19647727 | A1 | 5/1998 | |
| DE | 19737673 | A1 | 3/1999 | |
| DE | 19647753 | C2 | 9/2000 | |
| DE | 19937892 | C1 | 1/2001 | |
| DE | 10007334 | A1 | 9/2001 | |
| DE | 102004033721 | A1 | 9/2005 | |
| DE | 102006036487 | A1 * | 2/2008 | H05K 7/183 |
| DE | 102014101404 | A1 * | 8/2015 | A47B 47/0041 |
| WO | WO-2005034302 | A2 | 4/2005 | |
| WO | WO-2007104406 | A1 | 9/2007 | |

OTHER PUBLICATIONS

U.S. Appl. No. 16/306,360, filed Nov. 30, 2018, Heiko Holighaus.
U.S. Appl. No. 15/781,033, filed Jun. 1, 2018, Reuter et al.

* cited by examiner

SWITCH CABINET HAVING A FRAME AND AN INTERIOR FITTING COMPONENT, CORRESPONDING SWITCH CABINET ASSEMBLY, AND CORRESPONDING INTERIOR FITTING COMPONENT

CROSS-REFERENCE TO RELATED APPLICATIONS

This application is a 371 U.S. National Stage of International Application No. PCT/DE2017/100549, filed on Jun. 30, 2017, which claims priority to German Application No. 10 2016 117 393.2, filed on Sep. 15, 2016. The entire disclosures of the above applications are incorporated herein by reference.

BACKGROUND

This section provides background information related to the present disclosure which is not necessarily prior art.

TECHNICAL FIELD

The invention is directed to a switch cabinet comprising a rectangular rack consisting of four vertical profiles and eight horizontal profiles, wherein four of the profiles form a rectangular profile frame and two of the four profiles forming the profile frame and extending in parallel to one another each includes a first fastening profile side having a first row of fastening mounts spaced apart from one another while maintaining a constant grid dimension, wherein the first fastening profile sides are situated in a common plane, and mounted on these two first fastening profile sides is an interior structural component extending between the parallel profiles, which includes a mounting side having a second row of fastening mounts extending perpendicular to the first row. Such a switch cabinet is known from DE 196 47 802 C1. Similar assemblies are also described by DE 196 47 727 A1 and DE 196 47 753 C2.

Discussion

The horizontal profiles and vertical profiles, from which the rack of the switch cabinet is constructed, frequently include at least one profile side facing the interior of the switch cabinet having grid perforations, via which structural components for the interior structure of the switch cabinet can be secured to the rack of the switch cabinet. Such interior structural components are, in principle, not limited to any particular components. Mention is made merely by way of example of the known mounting rails cited from the prior art, also called mounting chassis, which may be mounted for example, between two profiles of the rack of the switch cabinet situated in parallel opposite one another, in order to provide additional mounting points between these profiles in the form of an additional row of holes consisting of fastening mounts, so that not only the fastening mounts of the profiles of the switch cabinet rack, but also the additional fastening points provided with the aid of the mounting rail are available as securing points for the interior structure of the switch cabinet.

It is a fundamental aim in switch cabinet construction to increase as much as possible the packing density of the components accommodated in the switch cabinet while taking all boundary conditions, such as thermal limitations, into account. In this regard, it is disadvantageous that to provide any additional mounting level in the known assemblies, it is necessary to provide an additional interior structural component, for example, a mounting rail of the aforementioned kind, which must necessarily be secured via the profiles of the rack. This limits the interior structural options of the known switch cabinets.

SUMMARY

This section provides a general summary of the disclosure, and is not a comprehensive disclosure of its full scope or all of its features.

It is therefore an aspect of the invention to further refine a switch cabinet of the previously described kind in such a way that it ensures a maximally flexible interior structure.

Accordingly, it is provided that the second row of fastening mounts is situated in the direction of extension of the first row of fastening mounts while maintaining the grid dimension of the first row of fastening mounts.

From a functional perspective, therefore, the second row of fastening mounts of the mounting side of the interior structural component extends the first row of fastening mounts in a direction perpendicular to the direction of extension of the first row of fastening mounts, but, unlike in the prior art, while maintaining the grid dimension of the first row of fastening mounts. The first row of fastening mounts, for example, may be formed along a vertical profile side of a vertical profile of the profile frame, wherein the first row of fastening mounts consists of fastening mounts spaced regularly apart while maintaining the grid dimension. The interior structural component may be a mounting chassis, the mounting side of which and a second row of fastening mounts extending along the mounting side extends perpendicularly, thus, extends horizontally, to the vertical profile. To ensure the aforementioned maintenance of the grid dimension in this case, it may be provided that the second row of fastening mounts of the interior structural component is situated at a vertical height that corresponds to the position of one of the fastening mounts of the first row of fastening mounts in the vertical direction, so that the relevant fastening mounts of the first row of fastening mounts is situated at the same height as the second row of fastening mounts of the interior structural component.

To ensure the maintenance of the grid dimension, it may be provided that the fastening means for securing the interior structural component to the profile frame are designed accordingly. For this purpose, the fastening elements may be hook elements, for example, which engage in the fastening mounts of the first row of fastening mounts of the profile frame. Such fastening means are known from DE 196 47 802 C1.

The dimensional stability of the fastening mounts may not, however, be limited only to the aforementioned combination of a profile frame with an interior structural component. It may also be provided that the fastening mounts of different profiles of the profile frame are also arranged while maintaining the grid dimension. For example, two profiles of the profile frame situated perpendicularly to one another may each include a fastening profile side, which lies in a common plane, wherein both fastening profile sides each include a row of fastening mounts extending along their longitudinal direction, so that the two rows of fastening mounts run, in particular, perpendicularly to one another. Similar to the relation of the fastening mounts of the interior structural component with respect to the profile side of the profile frame, it may be provided in this case that the two rows of fastening mounts of the two fastening profile sides are therefore arranged in a uniform grid matrix while maintaining the grid dimension, for example, a two-dimensional 25 mm×25 mm grid matrix.

It is easy to see that in the case in which the maintenance of the grid dimension extends over all rows of holes located in a plane on fastening profile sides and, optionally, on interior structural components fastened thereto, it is ensured that, for example, even if an additional interior structural component is secured via the row of fastening mounts of a first interior structural component, for example, perpendicular to the latter, the fastening mounts of the additional interior structural component are also arranged while maintaining the grid dimension, so that the described interior structural concept is arbitrarily cascadable. This results, in particular, in the advantage over the prior art that not only are the profile struts of the profile frame of the switch cabinet rack suitable for securing interior structural components, in particular, mounting rails or mounting chassis, but the second row of fastening mounts as well, which extends over a first interior structural component secured between two parallel profile struts of the rack, so that the second row of fastening mounts of this interior structural component may be used for the dimensionally stable securing of at least one additional interior structural component.

The fastening mounts within the meaning of the present invention are not limited to any particular geometries. In principal, however, rectangular fastening mount geometries have been shown to be particularly suited, since they allow the precise securing of the components to one another, for example, the interior structural component to the profile of the profile frame, due to their straight boundary sides. The fastening mounts may have, in particular, square or rectangular geometries, as they are shown in DE 196 47 802 C1.

To maintain the grid dimension, the midpoint of one each of the fastening mounts of the fastening profile sides may be situated on a straight line, on which the midpoint of the second row of fastening mounts of the mounting side is situated. In this way, it is ensured that the grid dimension is maintained, even if the fastening mounts of the first fastening profile side have a geometry that differs from the geometry of the fastening mounts of the interior structural component.

The two of the four profiles forming the profile frame and extending in parallel to one another may each include a first and a second fastening profile side having a first or a second row of fastening mounts spaced apart from one another while maintaining the same constant grid dimension, wherein the first fastening profile sides are situated on an outer side of the profile frame and the second of the two fastening profile sides spaced apart in parallel to the first fastening profile side is situated on an inner side of the profile frame situated opposite the outer side, and wherein the first fastening profile sides situated on the outer side are situated in a first common plane and the fastening profile sides situated on the inside are situated in a second common plane.

The first common plane may be a mounting plane accessible from the outer side of the rack for fastening the interior structural component, wherein the mounting plane is set back in relation to an outer sealing edge of the rack. A profile geometry suited for such purpose is known from DE 10 2014 101 404 A1.

The interior structural component mounted on the profiles on the first or the second plane may be situated with its mounting side in the respective plane on which it is mounted. For this purpose, the interior structural component may, for example, include mounting flanges, which project into the mounting side via an offset, so that a thickness compensation for the mounting flange is implemented via the offset. Since the interior structural component is secured to the profiles of the rack with its mounting side invariably facing the interior of the switch cabinet, the offset may be correspondingly offset depending on whether the interior structural component is to be secured on a plane accessible from the inside of the switch cabinet or on a plane facing the outer side of the rack.

At least one of the fastening profile sides per plane may include a positioning aid for mounting the first interior structural component in the plane, wherein the positioning aid comprises markings that are situated in the longitudinal direction of the respective first or second fastening profile side in a spacing relative to one another, which corresponds to the grid dimension or to a multiple thereof. The markings may be formed in the shape of passages through a sealing ridge adjacent to the first or to the second fastening profile side, wherein the sealing ridge is formed from two profile sides folded back on themselves over an at least 180° folded edge, so that the passage also has the function of providing a paint run-off for the immersion coating of the rack.

A second interior structural component may be secured to the first interior structural component, wherein an additional second row of fastening mounts of another mounting side of the second interior structural component in parallel to the first row of fastening mounts of the first fastening profile side extends perpendicularly to the second row of fastening mounts of the mounting side of the first interior structural component. It may be provided, in particular, that the two mounting sides of the two interior structural components, as well as the fastening profile side of the profile frame, via which at least the first interior structural component is secured to the profile frame, are situated in a common plane, so that the interior structural components, as well as the flush fastening profile sides of the profile frame form a common mounting plane having a dimensionally stable grid spacing in the two dimensions of the mounting plane.

The second row of fastening mounts of the additional mounting side of the second interior structural component may be arranged while maintaining the grid dimension of the first row of fastening mounts. In this case, the fastening mounts of the second row of fastening mounts of the first interior structural component may be arranged with the grid dimension of the first row of fastening mounts, both between one another as well as in relation to the first row of fastening mounts of the first fastening profile side, so that the fastening mounts of the first fastening profile side, as well as of the first and of the second interior structural component are arranged in a two-dimensional hole grid with the grid dimension constant in two directions, for example, in a 25 mm×25 mm hole grid.

According to another aspect, the invention relates to a switch cabinet assembly, which includes at least two switch cabinets of the previously described kind and the racks of which adjoin one another via their rectangular profile frames and are connected to one another along two adjacent profiles of the profile frames via at least one stack connector. The stack connector may include an additional mounting side having additional fastening mounts, wherein the additional mounting side is flush in each case with a third fastening profile side of the adjacent profiles. The third fastening profile sides may include a third row of fastening mounts, and may extend perpendicularly to the first and to the second fastening profile sides.

The profile frames may adjoin one another via sealing ridges extending perpendicularly to the first fastening profile sides of the profile frame, forming a spacing between the first fastening profile sides, which is bridged by the mounting side of the stack connector, thereby forming a continuous mounting plane between the profile frames of the adjacent switch cabinets.

The principles described above are similarly applicable both to racks stacked vertically on top of one another as well as to racks arranged horizontally in series, wherein a continuous mounting plane is formed between the profile frames of the racks adjacent to one another in the vertical direction, respectively, horizontal direction via corresponding stack connectors, in particular, the same stack connectors. Thus, a system grid continuous in the vertical direction, respectively, horizontal direction in particular, may be achieved, and interior structural components may be mounted across all cabinets.

To further enforce the consistency of a grid dimension of fastening mounts in the switch cabinet environment that is consistent and dimensionally stable across all components, it may be provided that a systematic perforation of fastening mounts is also formed in parallel profile sides of a door tube frame spaced in parallel apart from one another while maintaining the grid dimension, so that an interior structural component may be mounted between the profile sides spaced in parallel apart from one another.

If the rack includes fastening profile sides spaced in parallel apart from one another, each having fastening mounts formed therein, an interior structural component, for example, a mounting chassis, may be hook-mounted via a first of the two fastening profile sides and may either be also mounted from the outer side via these fastening profile sides, or may be screw-connected through the other fastening profile side via the inner side of the first fastening profile side.

The third fastening profile sides and the mounting side may each include fastening mounts spaced apart from one another along their longitudinal direction while maintaining a constant grid dimension, wherein the fastening mounts of the third fastening profile sides and of the mounting side are spaced apart from one another in a direction perpendicular to the longitudinal direction, optionally, while maintaining the grid dimension. The result of this is that the maintenance of the grid dimension also extends to all switch cabinets, i.e. between switch cabinet racks adjacent to one another, so that interior structural components may also be guided between the adjacent racks, so that the interior structural component is secured in a first rack via an oppositely situated first end, for example, on a vertically oriented mounting chassis in the first switch cabinet rack, and may be secured at a second end situated opposite the first end in the second rack adjacent to the first rack, in turn, for example, via another mounting chassis in the second switch cabinet rack.

The interior structural components may include multiple fastening points, for example, in each case a fastening means at opposite ends of the interior structural component, wherein the spacing of the fastening points or fastening means expediently corresponds to a multiple of the grid dimension.

The stack connector may include a fastening flange on each of the opposite longitudinal sides, which extends perpendicularly to its mounting side, wherein the stack connector is secured, in particular, screw-connected via the fastening flanges on opposite fastening profile sides to opposite outer sides of the adjacent profile frames.

All vertical and horizontal profiles may be formed as hollow chamber profiles, in particular, as hollow chamber profiles having identical cross sections. The hollow chamber profiles may include a first fastening profile side and a second fastening profile side, which are connected to one another spaced parallel apart via a third fastening profile side extending perpendicularly to the first and second fastening profile sides, wherein the first of the two fastening profile sides is situated on an outer side of the switch cabinet and a sealing ridge of the profile extends perpendicularly to this outer side, and wherein the second of the two parallel fastening profile sides is situated on an inner side of the switch cabinet.

The racks may having a rectangular base frame consisting of four horizontal profiles interconnected at right angles, wherein each of the profiles of the base frame has a circumferential support flange extending perpendicularly to the second fastening profile sides, with a circumferential row of fastening mounts.

According to still another aspect, the invention relates to an interior structural component for a switch cabinet or a switch cabinet assembly of the previously described kind, wherein the interior structural component is an interior structural rail, which includes a mounting side having a row of fastening mounts extending in the longitudinal direction of the interior structural rail and fastening means formed on its opposite ends for mounting the interior structural rail in the interior of the switch cabinet or of the switch cabinet assembly. The interior structural rail is distinguished by the fact that now the fastening means are matched to the grid dimension of the first row of fastening mounts of the first and/or of the second fastening profile sides in such a way that the second row of fastening mounts is situated in the direction of extension of the first row while maintaining the grid dimension of the first row when the interior structural rail is mounted in the switch cabinet via one of the fastening profile sides.

The interior structural component in this case may include multiple parallel second rows of fastening mounts, wherein the second rows maintain the grid dimension both in their longitudinal direction as well as between them, i.e., in the direction perpendicular to their longitudinal direction.

Finally, the fastening means at the ends of the interior structural component may be formed as mounting flanges, which include a section for accommodating a flat section holder and/or for crops in the form of round-offs on at least one of two opposite outer edges of at least one of the mounting flanges.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details of the invention are explained below with reference to the figure, in which.

DETAILED DESCRIPTION

Example embodiments will now be described more fully with reference to the accompanying drawings.

Figure 1:
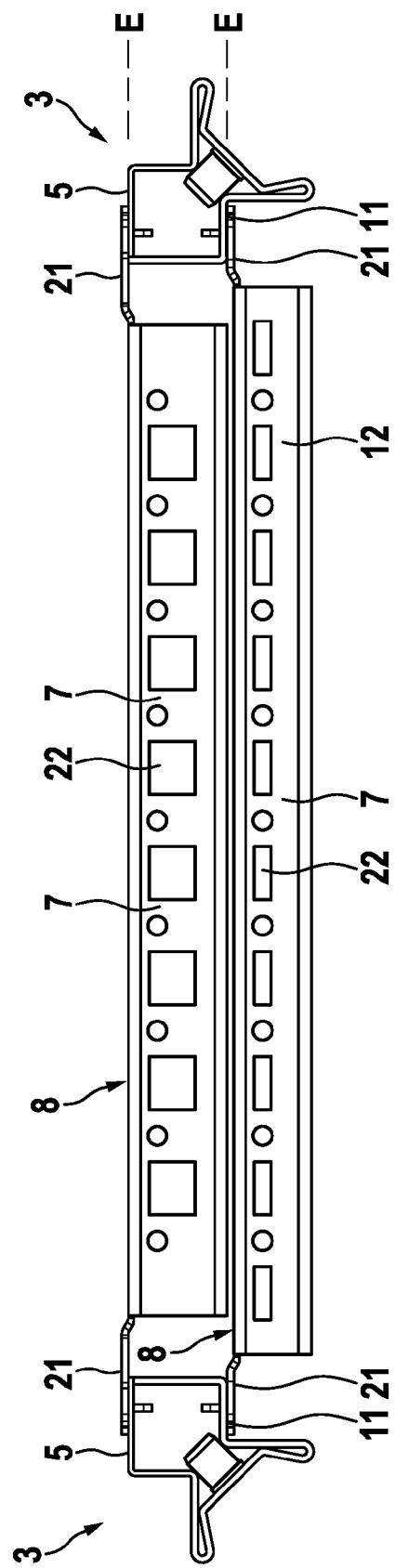
FIG. 1 shows a horizontal cross section through a vertical profile frame of a switch cabinet according to one embodiment.

FIG. 1 shows a horizontal cross section through a rack 2 of a switch cabinet 1, wherein the cross sectional geometry of the manifesting vertical profiles 3 resembles the geometry known from DE 10 2014 1011404 A1. The cross sectional geometry is distinguished, in particular, by the fact that the vertical profile 3 provides essentially two mounting planes E situated parallel to one another via the first fastening profile sides 5 and the second fastening profile sides 11. The fastening profile sides 5, 11 are situated in pairs in a plane E and each include a row of fastening mounts (not depicted), so that an interior structural component 7 in the plane E may be secured on the planes E.

The interior structural component 7 includes a mounting side 8, which extends essentially over the entire spacing between the vertical profiles 3. The ends of the mounting side 8 each join a fastening flange 21, via which the interior structural component 7 may be secured to the fastening profile sides 5, 11 and to the fastening mounts formed therein (not depicted). The interior structural component 7 may be designed for this purpose in the manner of a mounting chassis, as is known from DE 196 47 802 C1. The opposite ends of the mounting chassis 7 include fastening flanges 21, which comprise hook elements (cf. FIGS. 3 and 4), via which fastening mounts provided in the fastening profile sides 5, 11 may be hook-mounted. As is apparent, the interior structural component 7 includes an additional row of fastening holes 22 along its longitudinal side 12.

Figure 2:
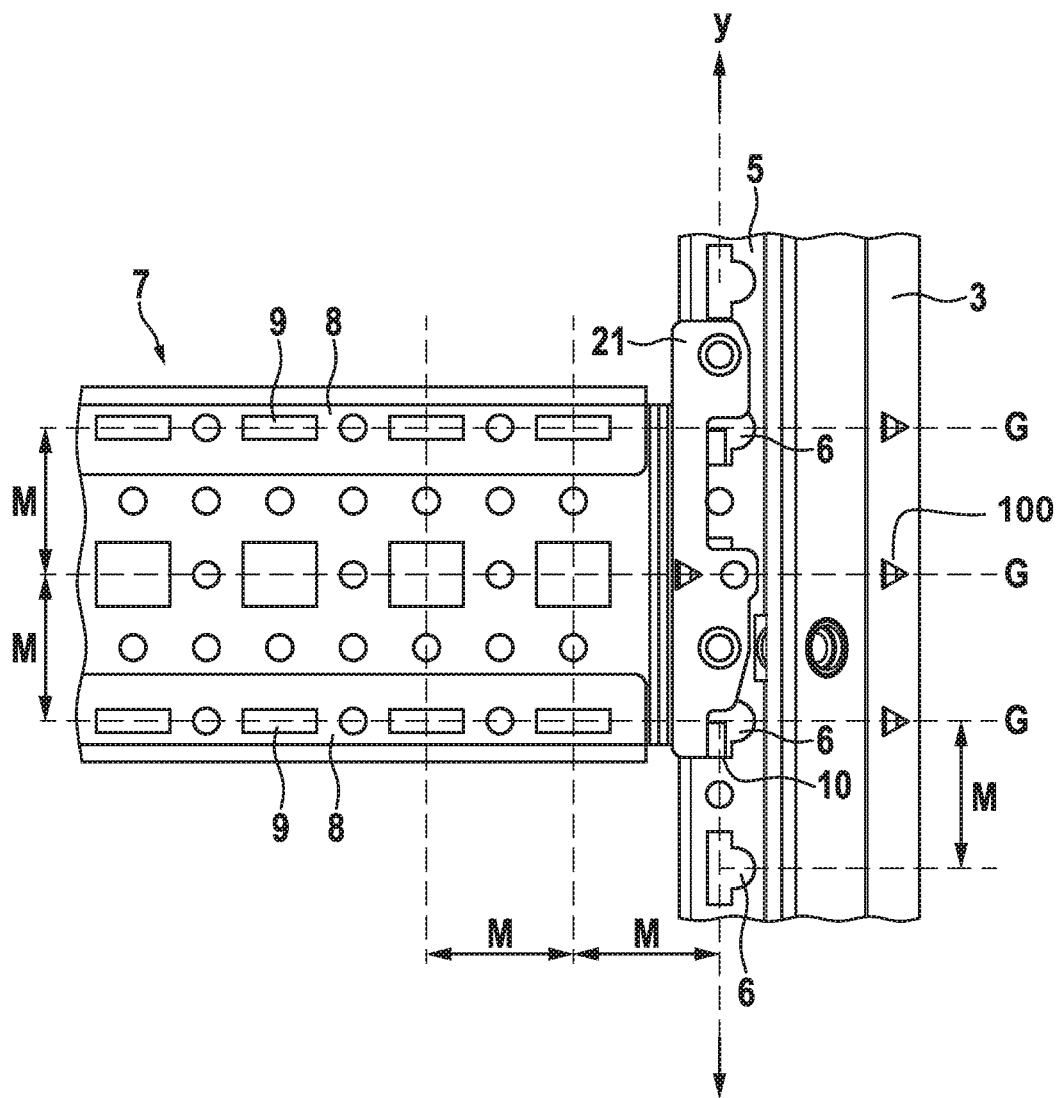
FIG. 2 shows a detail of the side view of a profile frame of a switch cabinet, to which an interior structural component is fastened, which maintains the grid dimension according to one embodiment.

FIG. 2 shows by way of example with reference to a detail view of a vertical profile 3 of a switch cabinet rack with hook-mounted interior structural component 7, which is designed as a mounting chassis, the cross-component retention of the grid dimension M. A first fastening profile side 5 of vertical profile 3 includes a first row of fastening mounts 6, which are arranged in the grid dimension M. Similarly, the mounting sides 8 of mounting chassis 7 each include a second row of fastening mounts 9 extending in the longitudinal direction of each mounting side 8 which, in turn, have a spacing that corresponds to the same grid dimension M.

It is also apparent in FIG. 2 that for the cross-component maintenance of the grid dimension M, i.e., for maintaining the grid dimension M between the vertical profile 3 and the interior structural component 7, the midpoint of one each of the fastening mounts 6 of the fastening profile sides 5 situated in a common plane E (cf. FIG. 1), is situated on a straight line G, on which the midpoint of the second row of fastening mounts of the mounting side 8 are situated. The result of this is that both the fastening mounts 6 in the fastening profile side 5, as well as the fastening mounts 9 in the mounting side 8 of the interior structural component 7 are situated in a two-dimensional hole grid, wherein the grid spacing in both spatial dimensions has in each case the grid dimension M.

To align the interior structural component 7 precisely in relation to the vertical profile 3, it is provided that the interior structural component 7 includes a mounting flange 21 having a hook element (cf. FIG. 3), via which the internal structural component 7 abuts boundary edge 10 of one of the fastening mounts 6 in the fastening profile side 5.

Figure 3:
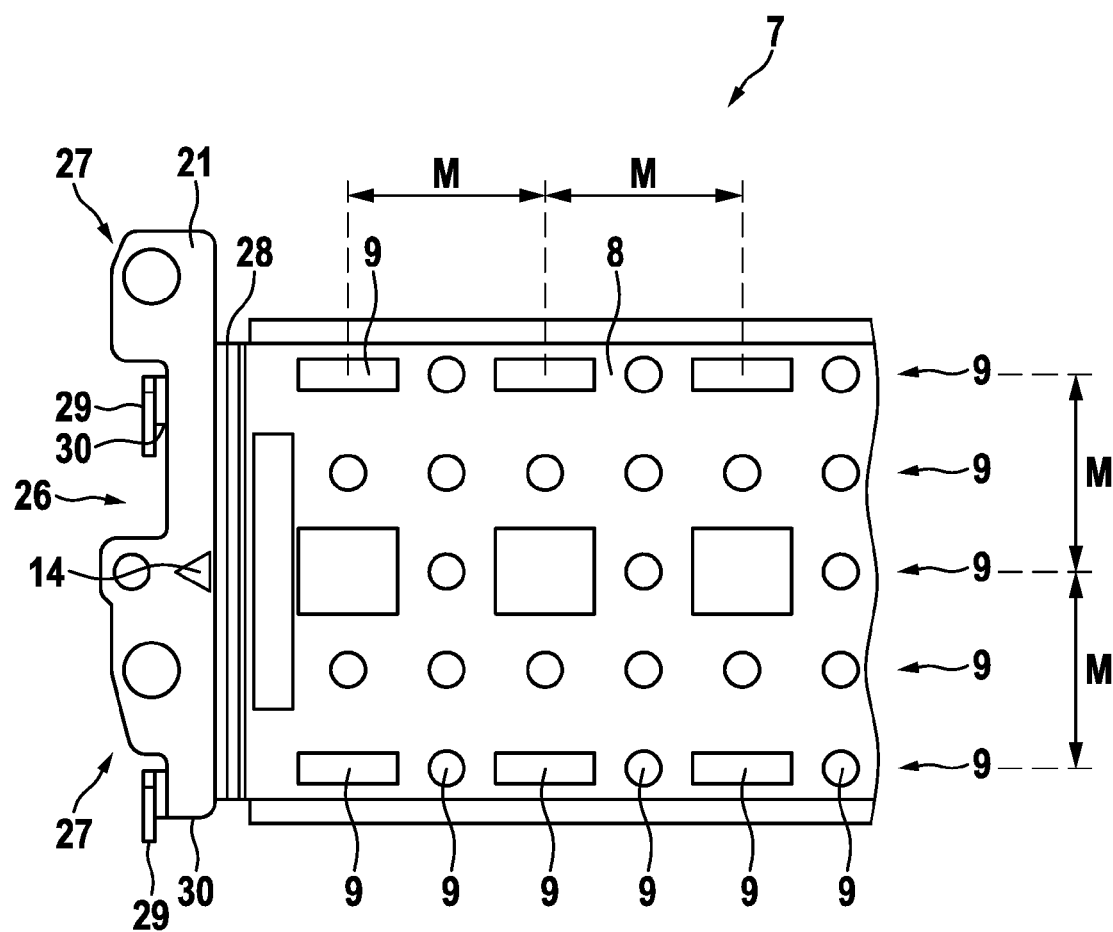
FIG. 3 shows a detail view of an interior structural component according to one embodiment formed as a mounting chassis.
Figure 4:
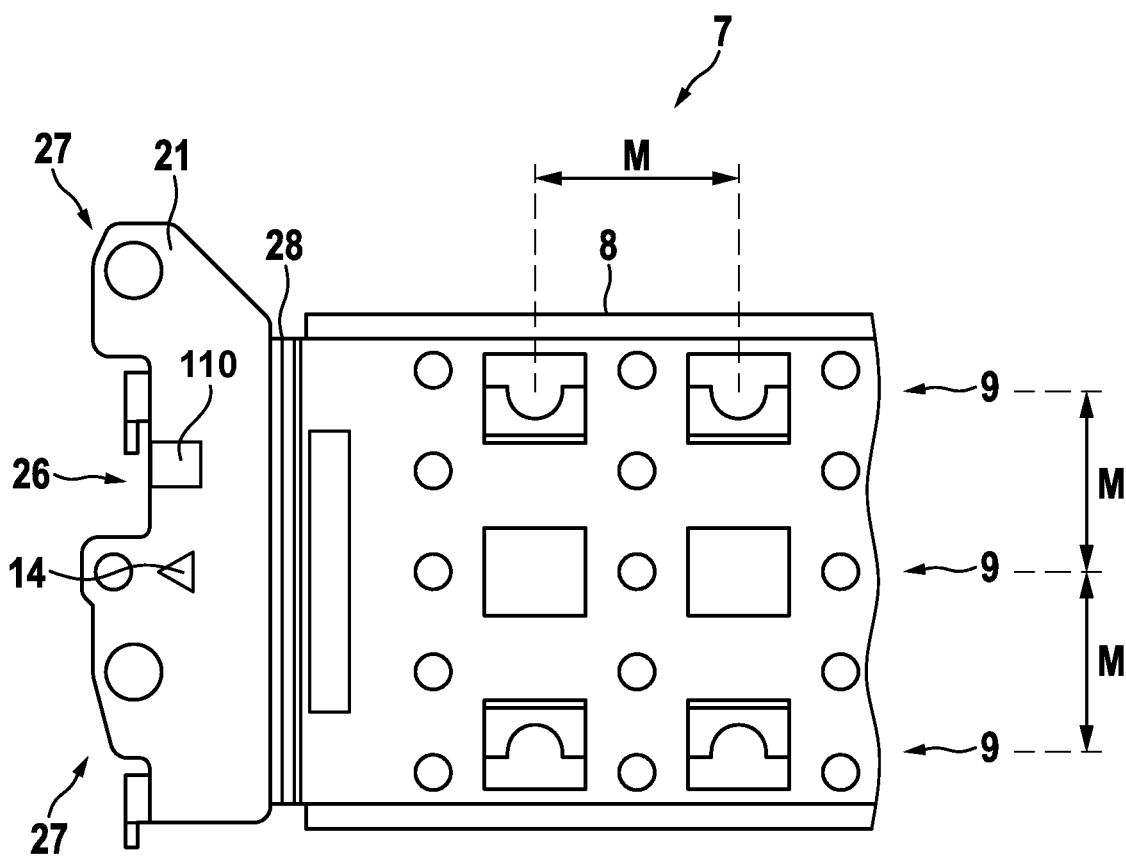
FIG. 4 shows another detail view of an interior structural component formed as a mounting chassis according to one embodiment.

Exemplary embodiments of an internal structural component 7 are shown with reference to the FIGS. 3 and 4. These are designed as mounting chassis. The ends of the mounting chassis each include a mounting flange 21, which may engage in the first row of fastening mounts of a frame profile via hooks 29. The hook elements 29 each include a contact side 30, via which the interior structural component 7 abuts the boundary edge 10 of one of the fastening mounts 6 on the fastening profile side 5 described with reference to FIG. 2, so that the second row of fastening mounts 9 in the mounting side 8 of the internal structural component 7 are precisely arranged in relation to the fastening mounts 6 of the first fastening profile side 5, namely, in such a way that the second fastening mounts 9 are arranged in the direction of extension of the first row of fastening mounts 6 while maintaining the grid dimension M of the first row of fastening mounts 6. In addition, the second fastening mounts 9 between them may be arranged in the grid dimension M and in relation to an associated fastening mount 6 of the fastening profile side 5 while also maintaining the grid dimension.

As shown in the FIGS. 3 and 4, the mounting side 8 may include multiple rows of fastening mounts 9, wherein the fastening mounts 9 of the rows may each be spaced apart in the longitudinal direction of the rows in the grid dimension M, and wherein a perpendicular spacing of the rows relative to one another may be formed also while maintaining the grid dimension M. Maintaining the grid dimension in this case may relate to similar hole geometries or to geometry-dependent consecutive fastening mounts. The grid dimension M may be 25 mm, for example.

For example, once again in reference to FIG. 2, the spacing between a fastening mount 6 in the fastening profile side 5 and an associated second row of fastening mounts 9 of the mounting side 8 may be, in particular, a multiple of the grid dimension M for each of the fastening mounts 9.

Figure 5:
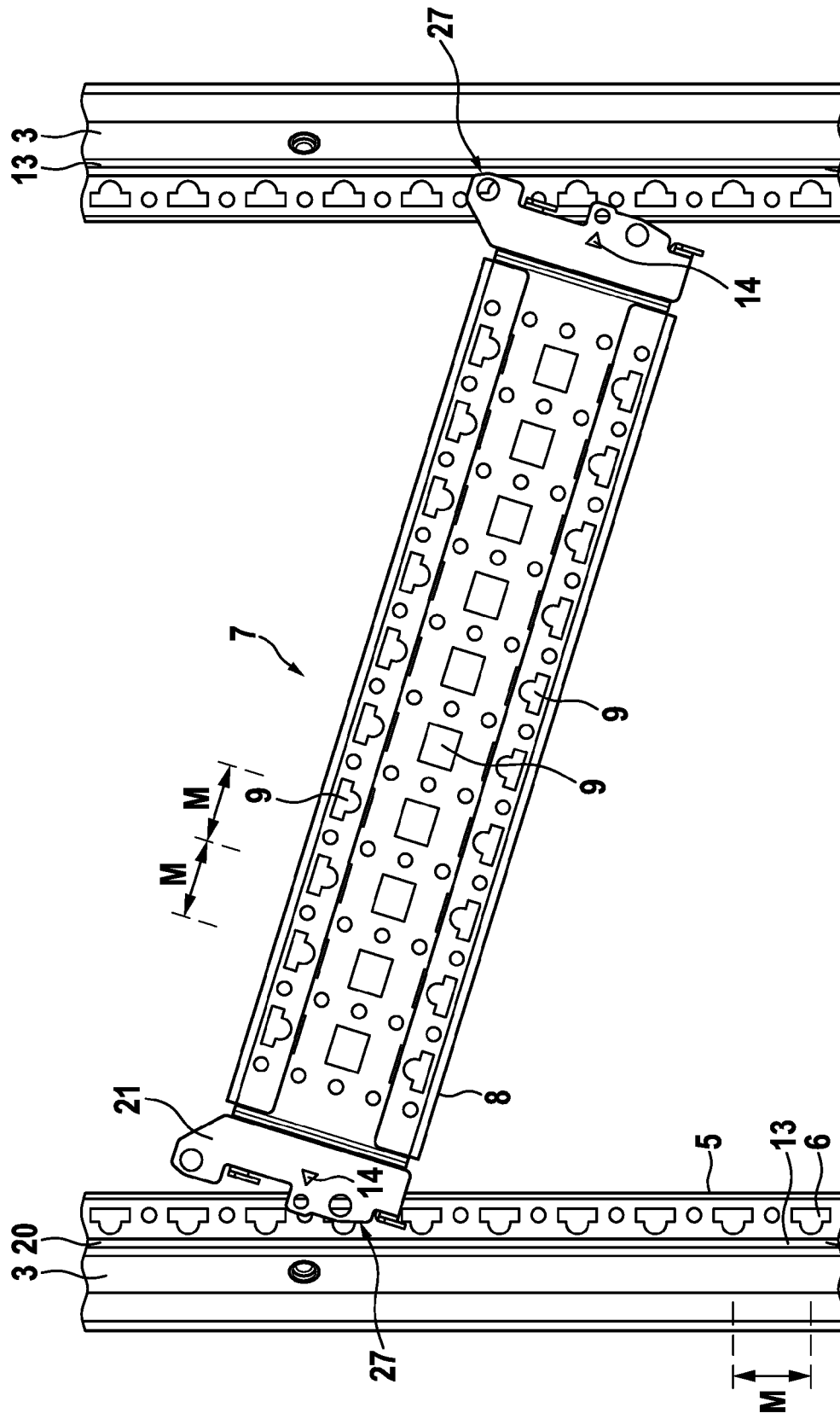
FIG. 5 shows a depiction for illustrating the hook mounting of a mounting chassis according to FIG. 4 via the opposite parallel profiles of a profile frame of a switch cabinet according to one embodiment.

The opposite outer edges of the mounting flanges 2 each include a crop 27, which is intended to allow the mounting chassis 7 to swivel, even when the mounting chassis 7 is to be mounted via the outer side on a mounting plane E that faces the outer side A of the switch cabinet 1 (compare FIG. 1), if a flat section is already mounted on the outer side, i.e., directly adjacent to the sealing ridges 20, so that access to the outer-lying fastening plane E from the outer side A of the switch cabinet 1 is sealed off. In this case, the mounting chassis 7 may be swiveled from the inner side I in the manner depicted in FIG. 5 (for the purpose of simpler presentation, the side wall has been omitted here). The crops 27 prevent the mounting chassis 7 from becoming jammed with the vertical profiles 3 during swiveling.

To simplify the mounting of the mounting chassis 7, the mounting flanges 21 of the chassis 7 each include a marking 14, wherein the sealing ridges 20 of the vertical profiles 3 include corresponding markings (not depicted).

Figure 6:
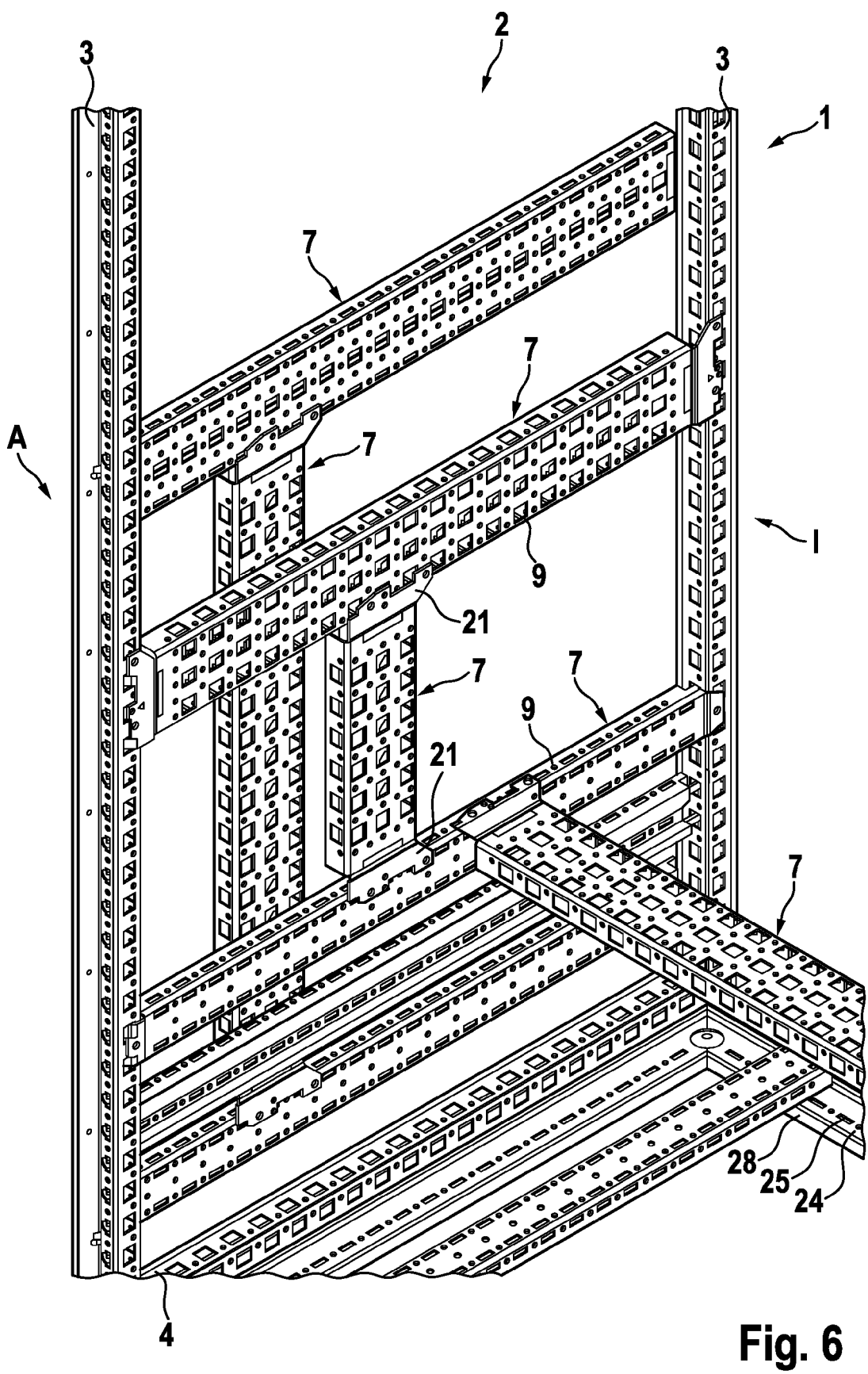
FIG. 6 shows a switch cabinet rack, via which various interior structural components are mounted according to one embodiment.
Figure 7:
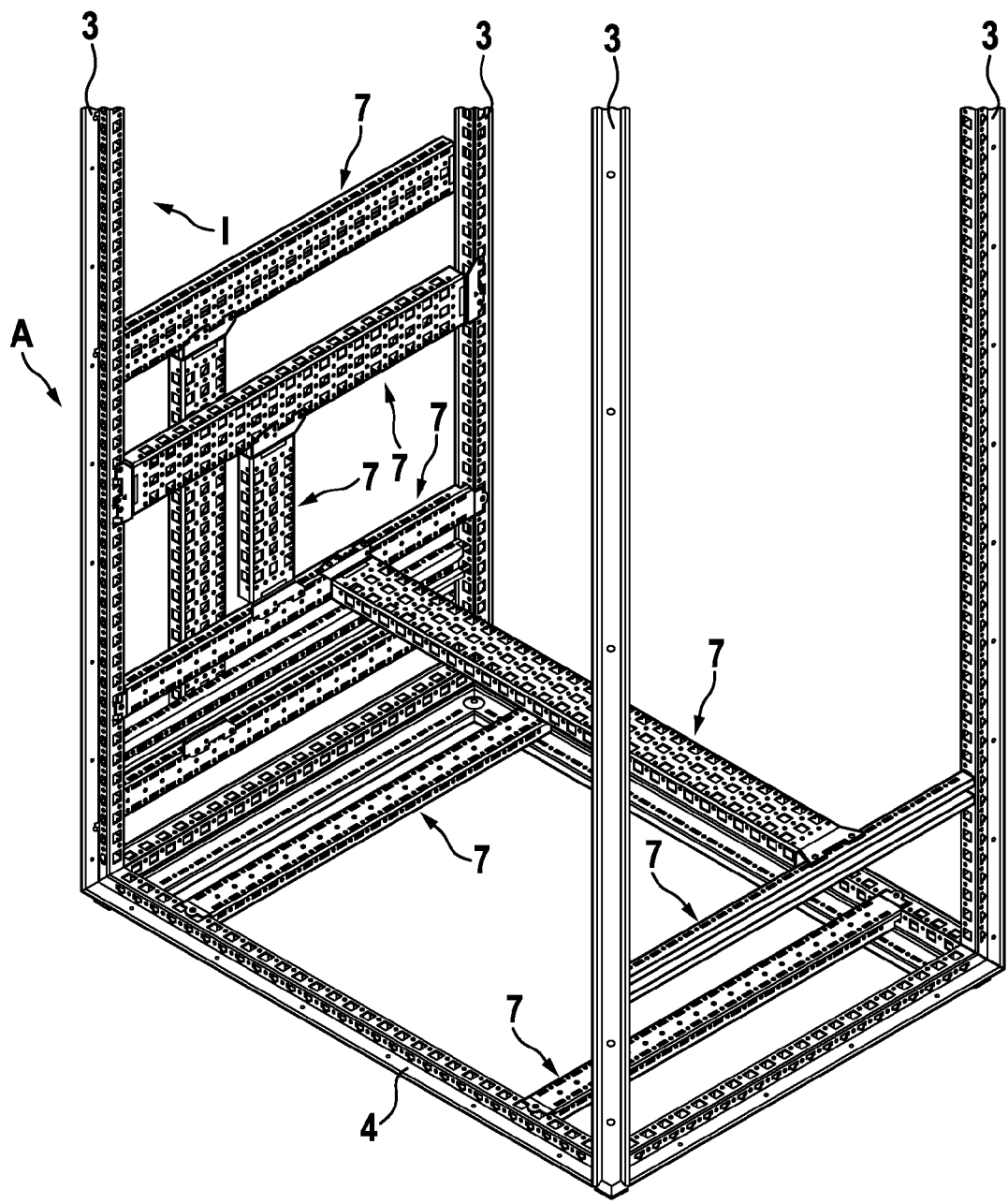
FIG. 7 shows another switch cabinet rack, via which various interior structural components are mounted according to one embodiment.

FIGS. 6 and 7 illustrate the possibility arising from the concept according to the invention of fastening mounting chassis for the switch cabinet interior structure. Whereas in the concepts known from the prior art, invariably only mounting chassis 7 could be mounted between opposite vertical profiles or horizontal profiles, the concept according to the invention, according to which the grid dimension, for example, a 25 mm grid dimension, may be consistently obtained in all spatial directions, makes it possible for mounting chassis 7 not only to be secured directly to profiles of the rack of the switch cabinet, but also, for example, as is shown in FIGS. 6 and 7, for the mounting of chassis 7, which are secured at a right angle to additional mounting chassis 7. As shown in FIGS. 6 and 7, two horizontal first mounting chassis 7 may thus, for example, be mounted between opposite vertical profiles 3 of the rack 2, which are spaced vertically apart from one another, wherein an additional mounting chassis 7 is arranged vertically relative to the two horizontal mounting chassis 7, and connects the latter via its opposite mounting flanges 21, which are fastened on opposite second rows of fastening mounts 9 of the first mounting chassis 7. The mounting concept is applicable to all three spatial dimensions in the switch cabinet. As depicted, an additional mounting rail 7, which extends perpendicularly to the mounting plane formed by the vertical profile 3, may therefore also be secured to a mounting chassis 7 mounted between the vertical profiles 7, wherein it is always ensured that the second rows of fastening mounts 9 provided by every mounting chassis 7 are situated within the two-dimensional or three-dimensional grid dimension.

FIGS. 6 and 7 also show that according to the invention, guide rails, which are used for installing mounting plates in the interior of the switch cabinet and which, according to the prior art, were also functionless, are thus also now incorporated into the 25 mm grid and thus, once the mounting plate has been secured in the switch cabinet interior, may also have as an additional function that of a mounting rail, therefore, that of a mounting chassis.

Figure 8:
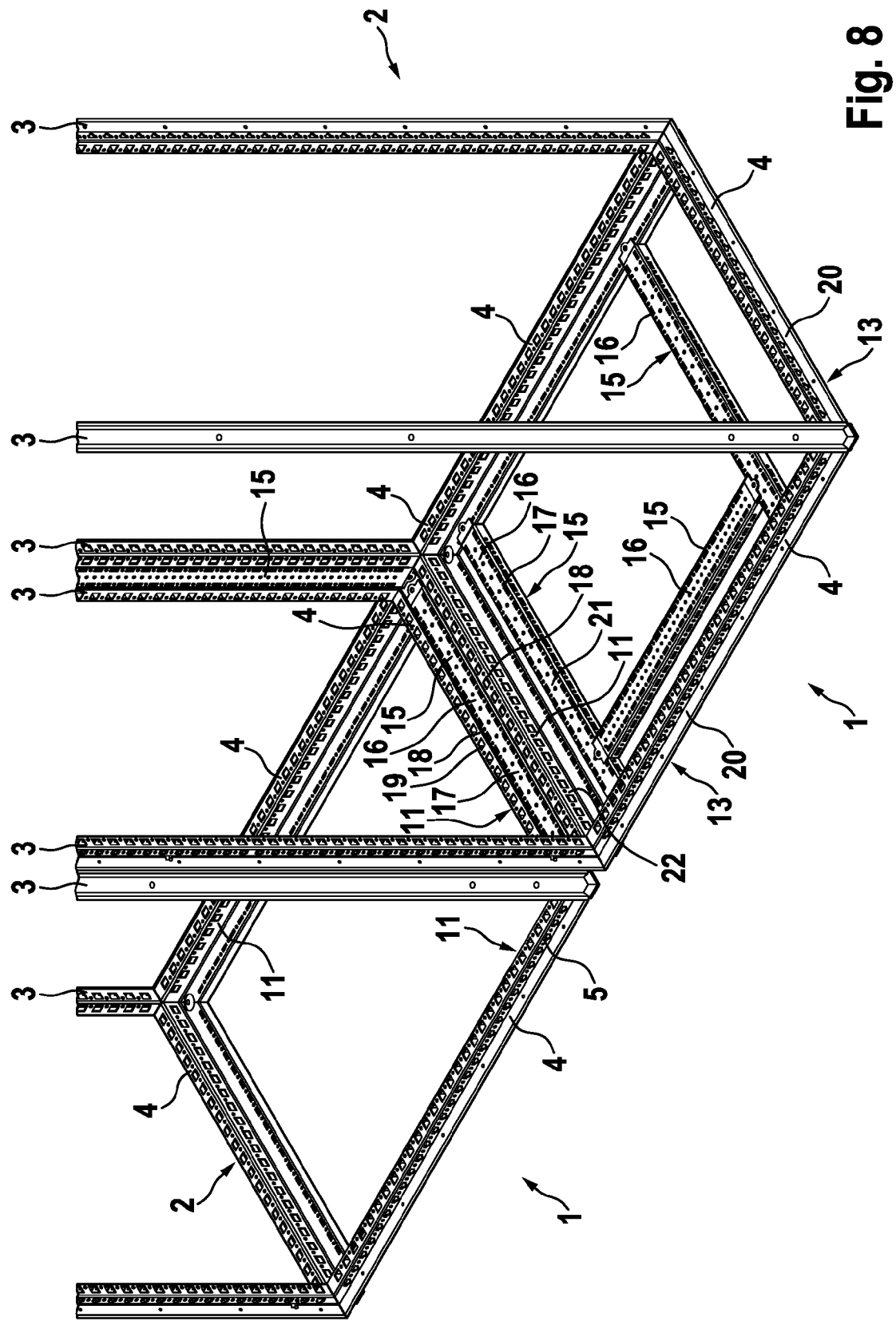
FIG. 8 shows a switch cabinet assembly consisting of two racks connected to one another via a stack connector.

FIG. 8 shows a switch cabinet assembly consisting of two switch cabinets 1, each of which includes a rack 2, wherein in each case two vertical profiles 3 and two horizontal profiles 4 (only the lower vertical profiles 4 are depicted), each form a profile frame, via which the adjacent racks 2 are connected to one another. The racks are connected to one another via a stack connector 15 formed as a mounting chassis, wherein the stack connector 15 includes an additional mounting side 16 having additional fastening mounts 17. The additional mounting side 16 in each case is flush with a third fastening profile side 18 of the adjacent profiles 3, 4 of the profile frame, wherein the third fastening profile sides 18 include a third row of fastening mounts 19, and extend perpendicularly to the first and second fastening profile sides 5, 11.

The profile frames adjoin one another via sealing ridges 20 extending perpendicularly to the first fastening profile sides 5 of the profile frame, and thus include a spacing between the two fastening profile sides 5. This spacing is bridged specifically by the mounting side 16 of the stack connector 15, so that a continuous mounting plane is formed between the profile frames 3, 4 of the adjacent switch cabinets 1.

The third fastening profile sides 18 and the mounting side 16 each include fastening mounts 17, 19 spaced apart from one another along their longitudinal direction while maintaining the constant grid dimension, wherein the fastening mounts 17, 19 of the third fastening profile sides 18 and of the mounting side 16 are spaced apart from one another in a direction perpendicular to the longitudinal direction while also maintaining the grid dimension. The result of this is that an interior structural component may be guided from the interior of a first of the switch cabinets 1 through the adjacent profile frames into the interior of one of the second switch cabinets 1, wherein the interior structural component 7 may be a mounting chassis, for example, which is secured to another mounting chassis also arranged in the grid dimension via its opposite fastening flanges.

The features of the invention disclosed in the preceding description, in the drawings as well as in the claims may be essential for implementing the invention, both alone and also in arbitrary combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switch cabinet, comprising
a square rack having four vertical profiles and eight horizontal profiles,
wherein four of the profiles form a rectangular profile frame, and two of the four profiles forming the rectangular profile frame and extending in parallel to one another each include a first fastening profile side having a first row of fastening mounts having midpoints spaced apart from one another while maintaining constant grid dimension,
wherein the first fastening profile sides are situated in a common plane and mounted on these two first fastening profile sides is a first interior structural component extending between the parallel profiles, the first interior structural component includes a mounting side having a second row of fastening mounts, which extend perpendicularly to the first row of fastening mounts,
wherein the second row of fastening mounts is arranged in the direction of extension of the first row of fastening mounts while maintaining the grid dimension of the first row of fastening mounts, by situating both the first row of fastening mounts in the first fastening profile side, as well as the second row of fastening mounts in the mounting side of the interior structural component in a two-dimensional hole grid,
wherein the grid spacing in both dimensions has in each case the grid dimension,
wherein the interior structural component is an interior structural rail, which includes the mounting side having the second row of fastening mounts extending in the longitudinal direction of the interior structural rail and fastening means formed on its opposite ends for mounting the interior structural rail in the interior of the switch cabinet, the fastening means are matched to the grid dimension of the first row of fastening mounts of the first and/or of the second fastening profile sides,
wherein the midpoints of the first fastening mounts and midpoints of the second fastening mounts being situated on a straight line when the interior structural rail is mounted in the switch cabinet via one of the fastening profile sides, a second interior structural component is secured to the first interior structural component, wherein an additional second row of fastening mounts of an additional mounting side of the second interior structural component parallel to the first row of fastening mounts of the first fastening profile side extends perpendicularly to the second row of fastening mounts of the mounting side of the first interior structural component, the second row of fastening mounts of the additional mounting side of the second interior structural component is arranged while maintaining the grid dimension of the first row of fastening mounts, a third interior structural component is secured to the first interior structural component, another second row of fastening mounts of another mounting side of the third interior structural component perpendicular to the first row of fastening mounts of the first fastening profile side extends perpendicularly to the second row of fastening mounts of the mounting side of the first interior structural component, the another second row of fastening mounts of the third interior structural component is arranged while maintaining the grid dimension of the first row of fastening mounts, wherein the fastening mounts of the second row of fastening mounts of the first interior structural component are arranged in the grid dimension of the first row of fastening mounts, both between each other, as well as in relation to the first row of fastening mounts of the first fastening profile side, so that the fastening mounts of the first fastening profile side, as well as the fastening mounts of the first, the second, and the third interior structural components are arranged in a three-dimensional hole grid with the grid dimensions constant in three dimensions, and wherein the first interior structural member extends along a width of the switch cabinet, the second interior structural member extends along a height of the cabinet, and the third interior structural member extends along a depth of the cabinet.

2. The switch cabinet according to claim 1, in which the two of the four profiles forming the profile frames and extending in parallel to one another, each includes a first and a second fastening profile side, each having a first row of fastening mounts spaced apart from one another while maintaining the same constant grid dimension, wherein the first fastening profile sides are arranged on an outer side of the profile frame, and the second of the two fastening profile sides is arranged spaced parallel apart relative to the first fastening profile side on an inner side of the profile frame situated opposite the outer side, and wherein the first fastening profile sides situated on the outer side are situated in a first common plane and the fastening profile sides situated on the inner side are situated in a second common plane.

3. The switch cabinet according to claim 2, in which the first common plane is a mounting plane for securing the interior structural component accessible from the outer side of the rack, and the mounting plane is set back in relation to an outer sealing edge of the rack.

4. The switch cabinet according to claim 1, in which the first interior structural component mounted on the profiles above the first or the second plane is situated with its mounting side in the respective plane via which it is mounted.

5. The switch cabinet according to claim 1, in which at least one of the fastening profile sides includes per plane a positioning aid for mounting the first interior structural component in the plane, wherein the positioning aid comprises markings that are arranged in the longitudinal direction of the first or second fastening profile sides at a spacing relative to one another, which corresponds to the grid dimension or to a multiple thereof.

6. The switch cabinet assembly according to claim 1, wherein all vertical profiles and horizontal profiles are designed as hollow chamber profiles, which include a first and a second fastening profile side, which are connected spaced apart in parallel to one another via a third fastening profile side extending perpendicularly to the first and second fastening profile sides, wherein the first of the two fastening profile sides is arranged on an outer side of the switch cabinet and extending perpendicularly to this is a sealing ridge of the profile, and wherein the second of the two fastening profile sides is arranged on an inner side of the switch cabinet.

7. The interior structural component according to claim 1, which includes multiple parallel second rows of fastening mounts, wherein the second rows maintain the grid dimension both in their longitudinal direction as well as in the direction perpendicular thereto.

8. The interior structural component according to claim 1, the fastening means, the ends of which are designed as mounting flanges, which include a section for accommodating a flat section holder and/or crops in the form of round-offs on at least one of two opposite outer edges of at least one of the mounting flanges.

9. A switch cabinet comprising:
four vertical profiles connected together by eight horizontal profiles to provide the switch cabinet with a height, width, and depth;
each one of the four vertical profiles extending along the height, at least two of the four vertical profiles extending in parallel and each including a fastening profile side situated in a common plane and having vertical profile fastening mounts with midpoints spaced apart from one another at a constant grid dimension;
a first interior structural component extending along the width of the switch cabinet between two of the four vertical profiles, the first interior structural component including first fasteners at opposite ends thereof, the first fasteners configured to cooperate with the vertical profile fastening mounts;
the first interior structural component is a first interior structural rail of the switch cabinet and includes a first row of first fastening mounts extending perpendicular to the vertical profile fastening mounts, the first fastening mounts are spaced apart from one another along the first row at the constant grid dimension of the vertical profile fastening mounts, midpoints of each of the first fastening mounts are aligned along the first row and aligned with midpoints of the vertical fastening mounts along a first straight line;
a second interior structural component extending along the height of the switch cabinet from the first interior structural component, the second interior structural component including second fasteners at opposite ends thereof, the second fasteners configured to cooperate with the first fastening mounts;
the second interior structural component is a second interior structural rail of the switch cabinet and includes a second row of second fastening mounts extending perpendicular to the first row of first fastening mounts, the second fastening mounts are spaced apart from one another along the second row at the constant grid dimension of the vertical profile fastening mounts, midpoints of each of the second fastening mounts are aligned along the second row and aligned with midpoints of the first fastening mounts along a second straight line;

a third interior structural component extending along the depth of the switch cabinet from the first interior structural component, the third interior structural component including third fasteners at opposite ends thereof, the third fasteners configured to cooperate with the second fastening mounts;

the third interior structural component is a third interior structural rail of the switch cabinet and includes a third row of third fastening mounts extending perpendicular to the first row of first fastening mounts, the third fastening mounts are spaced apart from one another along the third row at the constant grid dimension of the vertical profile fastening mounts, midpoints of each of the third fastening mounts are aligned along the third row and aligned with midpoints of the first fastening mounts along a third straight line;

wherein the vertical profile fastening mounts, the first fastening mounts, the second fastening mounts, and the third fastening mounts are arranged in a three-dimensional hole grid with the grid dimensions constant in three dimensions.

* * * * *